United States Patent
Wang et al.

(10) Patent No.: US 10,473,791 B1
(45) Date of Patent: Nov. 12, 2019

(54) GBAS INTEGRITY PERFORMANCE EVALUATION METHOD BASED ON PSEUDORANGE ERROR DISTRIBUTION MODEL

(71) Applicant: Beihang University, Beijing (CN)

(72) Inventors: Zhipeng Wang, Beijing (CN); Yanbo Zhu, Beijing (CN); Ludan Song, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/430,847

(22) Filed: Jun. 4, 2019

(30) Foreign Application Priority Data

Mar. 27, 2019 (CN) .......................... 2019 1 0236621

(51) Int. Cl.
| | | |
|---|---|---|
| *G01S 19/08* | (2010.01) | |
| *G01S 19/20* | (2010.01) | |
| *G01S 19/07* | (2010.01) | |
| *G01S 19/44* | (2010.01) | |
| *G01S 19/41* | (2010.01) | |

(52) U.S. Cl.
CPC .............. *G01S 19/08* (2013.01); *G01S 19/07* (2013.01); *G01S 19/20* (2013.01); *G01S 19/41* (2013.01); *G01S 19/44* (2013.01)

(58) Field of Classification Search
CPC .......... G01S 19/07; G01S 19/08; G01S 19/20; G01S 19/15; G01S 19/41; G01S 19/40; G01S 19/42; G01S 19/51; G01S 19/44; G08G 5/025; G01C 21/165
See application file for complete search history.

(56) References Cited

U.S. PATENT DOCUMENTS

| | | | | |
|---|---|---|---|---|
| 7,994,974 | B2 * | 8/2011 | Levy ....................... | G01S 19/08 342/357.58 |
| 8,203,482 | B2 * | 6/2012 | Azaola Saenz ......... | G01S 19/42 342/357.23 |
| 8,878,720 | B2 * | 11/2014 | Ono ........................ | G01S 19/07 342/357.23 |
| 10,282,673 | B2 * | 5/2019 | Wang ..................... | G06N 20/00 |

(Continued)

*Primary Examiner* — Olumide Ajibade Akonai
(74) *Attorney, Agent, or Firm* — Locke Lord LLP; Tim Tingkang Xia, Esq.

(57) ABSTRACT

The present invention provides a ground-based augmentation system (GBAS) integrity performance evaluation method based on a pseudorange error distribution model, including: an airborne receiver terminal performing GBAS integrity performance evaluation by acquiring pseudorange error sample data, including the following method steps: a) grouping the pseudorange error sample data; b) building a distribution model having a Gaussian kernel and quadratic Gaussian polynomial tails for each group of pseudorange error samples; c) calculating a weighted sum of the distribution model of each group of pseudorange errors, to obtain an overall pseudorange error distribution model; d) projecting the pseudorange errors to position domain errors; e) calculating a probability that a position domain error is greater than an alarm limit, to obtain an integrity risk probability value; and f) evaluating GBAS integrity performance. The method improves the calculation accuracy of the integrity risk probability value and enhances the effectiveness of integrity evaluation.

9 Claims, 4 Drawing Sheets

(56) References Cited

U.S. PATENT DOCUMENTS

| | | | | |
|---|---|---|---|---|
| 2012/0146851 A1* | 6/2012 | Fernandez | ............. | G01S 19/02 |
| | | | | 342/357.58 |
| 2015/0362598 A1* | 12/2015 | Rollet | ................... | G01S 19/15 |
| | | | | 701/17 |
| 2016/0109579 A1* | 4/2016 | Navarro Madrid | ..... | G01S 19/39 |
| 2019/0187295 A1* | 6/2019 | Lee | ...................... | G01S 19/41 |

* cited by examiner

GBAS INTEGRITY PERFORMANCE EVALUATION METHOD BASED ON PSEUDORANGE ERROR DISTRIBUTION MODEL

CROSS-REFERENCE TO RELATED PATENT APPLICATION

This non-provisional application claims priority to and the benefit of, pursuant to 35 U.S.C. § 119(a), patent application Serial No. CN201910236621.2 filed in China on Mar. 27, 2019. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to the technical field of satellite navigation, and more particularly to a GBAS integrity performance evaluation method based on a pseudorange error distribution model.

BACKGROUND

A ground-based augmentation system (GBAS) establishes a ground reference station with known location and differentially processes the ranging values to achieve enhanced positioning accuracy and real-time monitoring of navigation signal integrity within a region. To assess whether the navigation service provided by the installed GBAS in the local airspace (within the 50 Km centered on the GBAS ground station) meets the corresponding flight performance requirements, four aspects including accuracy, continuity, integrity and availability need to be investigated. Integrity is essential for ensuring user safety and is the most important performance requirement in the field of civil aviation navigation.

Integrity refers to the ability to issue an alarm to an on-board user in time when the navigation system cannot be used for some predetermined work during operation. The core indicators of integrity include alarm time, alarm limit, and integrity risk probability value. The integrity risk probability value refers to the probability that the system fails to be used for navigation and cannot alert the user within a specified alarm time.

However, in the prior art, the evaluation of the integrity performance has a problem of strong correlation of samples. In the case of a small number of samples, the accuracy of the integrity risk probability value is lowered, leading to low effectiveness of the evaluation.

Therefore, in order to solve some problems in the prior art, a GBAS integrity performance evaluation method based on a pseudorange error distribution model is needed.

SUMMARY

An objective of the present invention is to provide a GBAS integrity performance evaluation method based on a pseudorange error distribution model, wherein a data processor performs GBAS integrity performance evaluation by acquiring pseudorange error sample data, including the following method steps:

a) grouping the pseudorange error sample data;

b) building a distribution model having a Gaussian kernel and quadratic Gaussian polynomial tails for each group of pseudorange error samples, including:

calculating a standard deviation $\sigma_i$ of each group of error samples, and fitting an error distribution kernel by using a Gaussian distribution having a mean $\mu_i$ of 0 and a standard deviation of $\sigma_i$, wherein a probability density distribution function is:

$$f_{h,i}(x) = \frac{1}{\sqrt{2\pi}\,\sigma_i} e^{-\frac{x^2}{2\sigma_i^2}}, |x| < E_f,$$

wherein $E_f$ is a kernel-tail demarcation point, and $i=1, \ldots, \tau$;

modeling an error distribution tail by using a quadratic polynomial of a Gaussian kernel distribution, wherein a probability density function is:

$$f_{w,i}(x) = af_{h,i}^2(x) + bf_{h,i}(x) = \frac{a}{2\pi\sigma_i^2} e^{-\frac{x^2}{\sigma_i^2}} + \frac{b}{\sqrt{2\pi}\,\sigma_i} e^{-\frac{x^2}{2\sigma_i^2}}, |x| > E_f,$$

wherein a and b are respectively a quadratic coefficient and a primary coefficient, and satisfy a+b=1 and $$0 < a < -\frac{1}{2};$$

and the error sample distribution satisfies:

$$f_i(x) = \begin{cases} \alpha f_{h,i}(x), |x| < E_f \\ \alpha f_{w,i}(x), |x| > E_f \end{cases},$$

wherein $\alpha$ is a scale factor and satisfies:

$$\alpha = \left\{ \int_{x=-\infty}^{-E_f} f_{w,i}(x)dx + \int_{x=-E_f}^{E_f} f_{h,i}(x)dx + \int_{x=E_f}^{\infty} f_{w,i}(x)dx \right\}^{-1};$$

c) calculating a weighted sum of the distribution model of each group of pseudorange errors, to obtain an overall pseudorange error distribution model;

d) projecting the pseudorange errors to position domain errors;

e) calculating a probability that a position domain error is greater than an alarm limit, to obtain an integrity risk probability value; and f) evaluating GBAS integrity performance.

Preferably, the data processor acquires data at time intervals of 1 s.

Preferably, grouping the pseudorange error sample data, including the following method steps:

acquiring $N_k$ (k=1, 2, ... m) pseudorange error samples corresponding to each satellite, dividing the pseudorange error samples according to a time interval $\tau$ into $$\frac{N_k}{\tau}$$

groups $$\left\{T_1, T_2, \ldots, T_i, \ldots, T_{\frac{N_k}{\tau}}\right\},$$

and then reassembling an ith sample in each group into $t_i$, where there are a total of $\tau$ groups of samples $\{t_1, t_2, \ldots, t_i, \ldots, t_\tau\}$, and m is the quantity of visible satellites.

Preferably, values of the unknown parameters a and b of the probability density function of the pseudorange error distribution tail are estimated in accordance with the principle of least sum of squared deviations.

Preferably, when $E_f$ is given, a least sum of squared deviations $Q_i(E_f)$ of the ith group is calculated, and a minimum $\min(Q_i(E_f))$ of the least sum of squared deviations is used to determine the kernel-tail demarcation point $E_f$.

Preferably, the GBAS integrity performance under H0 is evaluated by using $P_{risk}=P(|y|>AL)P_{free-fault}$, wherein Y is a position domain error, AL is an alarm limit, $P_{free-fault}$ is a probability that both a reference receiver and a ranging source are fault-free and has a value of 1, and $P_{risk}$ is the integrity risk probability value.

Preferably, when the GBAS integrity performance under H1 hypothesis is evaluated, the method further includes, before the step a), simulating a single-reference-receiver fault by using a GNSS simulator and a fault simulation program, wherein the GNSS simulator generates a satellite signal is radio frequency connected to the reference receiver, and the fault simulation program receives ranging information from the reference receiver, and adds a slope error to the ranging information from the reference receiver according to a fault parameter configuration, to simulate the single-reference-receiver fault.

Preferably, the GBAS integrity performance under H1 is evaluated by using $P_{risk}=P(|y|>AL)P_{receiver-fault}$, wherein y is a position domain error, AL is an alarm limit, $P_{receiver-fault}$ is a probability that only one reference receiver is faulty and has a value of $10^{-5}$, and $P_{risk}$ is the integrity risk probability value.

Preferably, when the GBAS integrity performance is evaluated under H2 hypothesis, the method further includes, before the step a), simulating fives ranging source faults including signal distortion, low signal power, code-carrier separation, unduly large ephemeris error, and super acceleration by using a GNSS simulator and a fault simulation program, wherein the GNSS simulator generates a satellite signal is radio frequency connected to a reference receiver, and the fault simulation program receives ranging information from the reference receiver, sets fault parameters, adds a slope error model to simulate four ranging source faults including signal distortion, low signal power, code-carrier separation, and unduly large ephemeris error, and adds a squared error model to simulate the super acceleration fault.

Preferably, the GBAS integrity performance under H2 is evaluated by using $P_{risk}=P(|y|>AL)P_{fault}$, wherein y is a position domain error, AL is an alarm limit, $P_{fault}$ is a probability of occurrence of fives ranging source faults including signal distortion, low signal power, code-carrier separation, unduly large ephemeris error, and super acceleration, and $P_{risk}$ is the integrity risk probability value.

In the GBAS integrity performance evaluation method based on a pseudorange error distribution model according to the present invention, the quadratic polynomial of the Gaussian kernel distribution is used to model the error tail. The kernel-tail demarcation point is selected in accordance with the principle of least sum of squared deviations. The error distribution model separating the kernel and the tail can ensure the precision of the error distribution model of the kernel part, is closer to the real distribution, and can also reduce the statistical uncertainty of the error distribution model of the tail part.

In the GBAS integrity performance evaluation method based on a pseudorange error distribution model according to the present invention, considering the characteristics of thick tail and correlation of pseudorange errors of the GBAS, the real distribution model of pseudorange errors is established by using a distribution mixing a Gaussian kernel and a quadratic Gaussian polynomial tail, and according to the projection relationship between position domain errors and pseudorange errors, the integrity risk probability value is calculated, and integrity of the system is evaluated, thus improving the precision of the kernel part error distribution, and improve the envelope tightness of the tail part error distribution. The error distribution model is closer to the real error distribution, achieves a more accurate integrity risk probability value, and improves the effectiveness of system integrity evaluation.

Due to the time correlation of pseudorange errors of the GBAS, the independent sample size is limited, resulting in inaccuracy of the error distribution model. To solve this problem, in the GBAS integrity performance evaluation method based on a pseudorange error distribution model according to the present invention, the error samples are grouped according to a certain time interval, and then the error samples with the same time serial number in each group are recombined to form a new error sample group, and an error distribution model is established for each new error sample group.

The GBAS integrity performance evaluation method based on a pseudorange error distribution model according to the present invention makes full use of the error samples, the distribution model of each group of error samples is subjected to weighted summation to obtain a mixed error distribution model, that is, the overall error distribution model.

The GBAS integrity performance evaluation method based on a pseudorange error distribution model according to the present invention reduces the influence of time correlation on the error distribution modeling when the sample is limited, reduces the statistical uncertainty of model parameters, and achieves a more accurate error distribution model and therefore a more accurate integrity risk probability value, thus achieving the effective evaluation of the GBAS integrity performance.

Since the kernel part of the error distribution has a large sample size but the tail part has a small sample size, in order to make the model of the kernel part more accurate and the tail part of the model relatively conservative, in the GBAS integrity performance evaluation method based on a pseudorange error distribution model according to the present invention, the kernel and the error distribution tail model are considered separately. The Gaussian distribution is used to approximate the kernel part error distribution, and the quadratic Gaussian polynomial distribution is used to approximate the tail part error distribution.

It should be understood that the foregoing general description and the following detailed description are exemplary and explanatory, and are not intended to limit the contents the present invention seeks to protect.

BRIEF DESCRIPTION OF THE DRAWINGS

More objectives, functions, and advantages of the present invention will be set forth in the following description of specific embodiments of the present invention with reference to the accompanying drawings, in which.

DETAILED DESCRIPTION

The objectives and functions of the present invention and methods for achieving such objectives and functions will be illustrated through exemplary embodiments. However, the present invention is not limited to the exemplary embodiments disclosed below, but may be implemented in different forms. The essence of this specification is merely for the purpose of helping those skilled in the art to comprehensively understand the specific details of the present invention.

Figure 1:
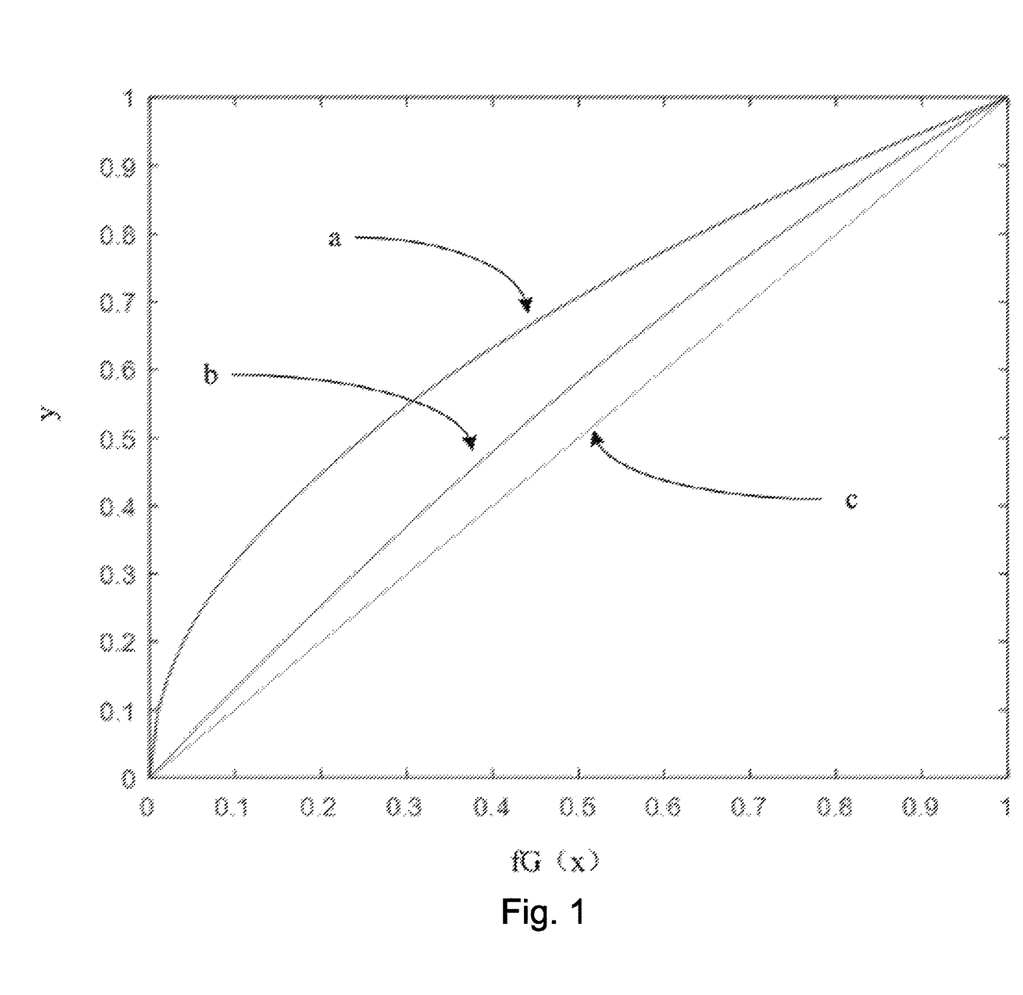
FIG. 1 schematically shows a comparison between a Gaussian distribution, a quadratic Gaussian polynomial distribution, and an exponential distribution.

Hereinafter, the embodiments of the present invention will be described with reference to the accompanying drawings, and relevant technical terms should be well known to those skilled in the art. In the accompanying drawings, same reference numerals denote same or similar parts or steps, unless otherwise specified. The contents of the present invention are described below through specific embodiments. The GBAS integrity performance evaluation method based on a pseudorange error distribution model according to the present invention is described below through specific embodiments. Since the GBAS error sample has a thick tail characteristic, the tail part of the real error distribution model is between the Gaussian distribution and the exponential distribution. If the Gaussian distribution is used to approximate the error distribution tail, the integrity risk probability value of the system is underestimated, and an integrity risk event is additionally introduced. If the exponential distribution is used to approximate the error distribution tail, it will be too conservative, the integrity risk probability value of the system will be overestimated, reducing system availability. In order to conservatively estimate the integrity risk probability value while reducing impact on the availability of the system, the present invention uses a quadratic Gaussian polynomial distribution model to approximate the error distribution tail, thus improving the accuracy of the integrity risk probability value. The Gaussian distribution probability density function (PDF) is used as an independent variable of the quadratic polynomial to obtain the quadratic Gaussian polynomial distribution. The exponential distribution can be regarded as the square root of the Gaussian distribution, which is similar to the relationship between the quadratic polynomial value, the linear equation value, and the square root value when the value range of the independent variable is [0, 1], and the appropriate distribution parameters can be selected, so that the PDF of the quadratic Gaussian polynomial distribution is between the PDF of the Gaussian distribution and the PDF of the exponential distribution. FIG. 1 shows a comparison between a Gaussian distribution, a quadratic Gaussian polynomial distribution, and an exponential distribution. In the figure, curve a is an exponential distribution curve b is a quadratic Gaussian polynomial distribution, and c is a Gaussian distribution.

According to the relationship between values of slopes of linear equation, quadratic polynomial and square radical at positions where the independent variable is equal to 0 and 1 and assuming that the quadratic polynomial has a value of 0 when the independent variable is 0 and 1, constraints of the unknown parameters of the quadratic Gaussian polynomial distribution are determined. The PDF of the quadratic Gaussian polynomial distribution is:

$$f(x) = af_G^2(x) + bf_G(x),$$

where a+b=1, $$0 < a < -\frac{1}{2},$$

and $f_G(x)$ is the PDF of the Gaussian distribution.

It should be noted that, the quadratic Gaussian polynomial distribution proposed by the present invention only properly envelops the error distribution tail, and conservatively describes the real situation of the error distribution tail, so it is not necessary to require the maximum value of the quadratic Gaussian polynomial distribution function to be 1.

Figure 2:
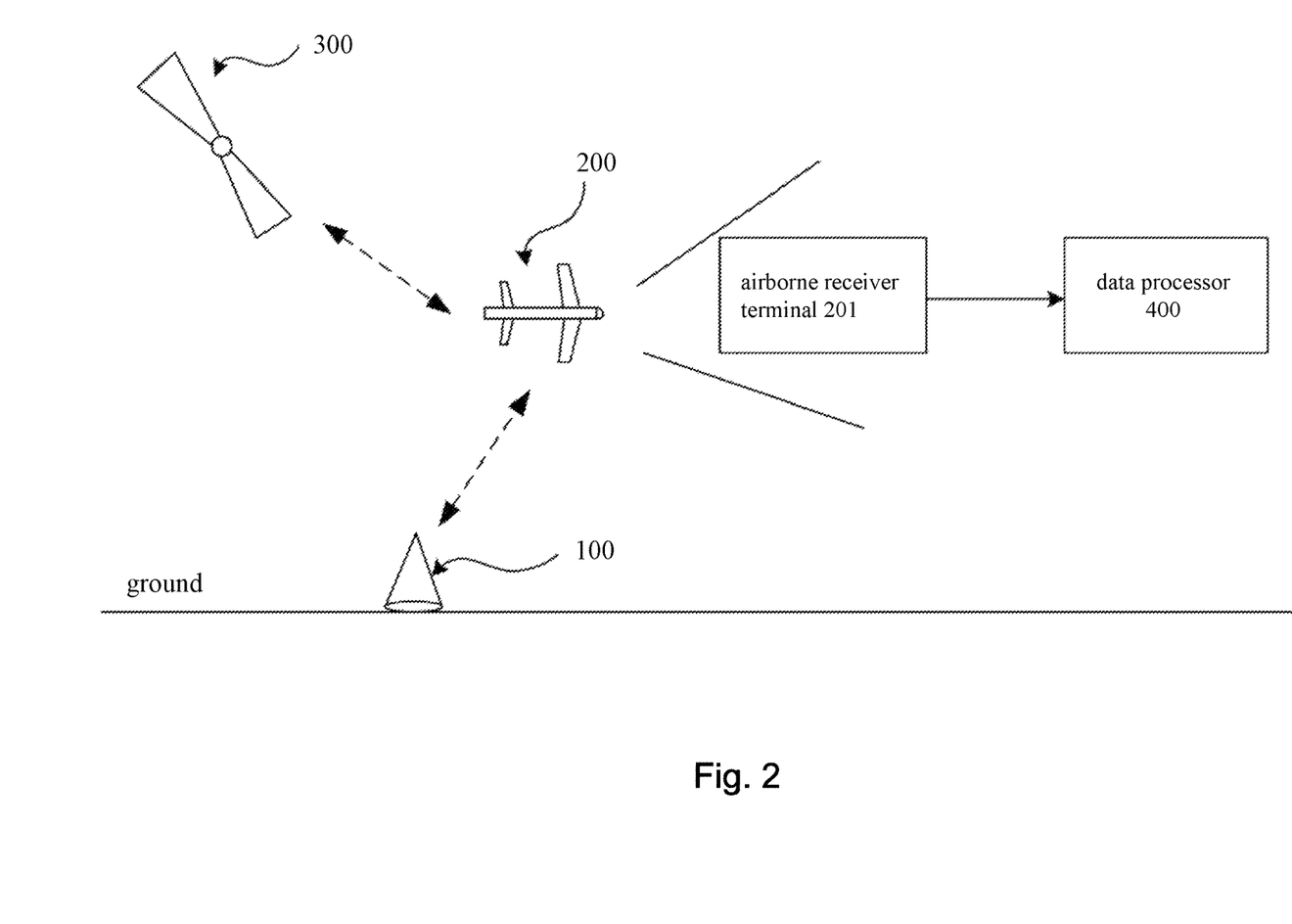
FIG. 2 is a block diagram of acquiring pseudorange error samples according to an embodiment of the present invention.

In order to make the content of the present invention more clearly explained, the data source is first described. FIG. 2 is a block diagram of acquiring pseudorange error samples according to an embodiment of the present invention. A ground reference station 100 provides differential data to an airborne receiver terminal 201 arranged on an aircraft 200. A satellite 300 provides ephemeris information to the airborne receiver terminal 201 arranged on the aircraft 200. The airborne receiver terminal calculates pseudorange error sample data according to the differential data provided by the ground reference station 100 and the ephemeris information from the satellite.

It should be understood that, the pseudorange error sample data may be calculated according to the differential data and the ephemeris information by using a method well known to a person skilled in the art. Any method capable of calculating the pseudorange error can be used, and no specific limitation is imposed in the present invention.

The data processor 400 acquires the pseudorange error data from the airborne receiver terminal.

Since the probability of receiver fault and the probabilities of other faults are small, samples collected in the actual environment are mostly samples without faults, that is, H0 hypothesis. H0 hypothesis means that all reference receivers and ranging sources are working normally. Under H0 hypothesis, the cause of the integrity risk event may be the multipath effect of signals and the receiver noise. In order to obtain the error sample data in the case of H1 and H2, the GNSS simulator needs to be used in combination with a fault simulation program to set a fault model to acquire pseudorange error data when a fault occurs. H1 hypothesis refers to that there is one and only one faulty reference receiver. Under H1 hypothesis, the fault may not be detected immediately by the ground subsystem, affecting the validity of broadcasted augmentation information and causing a positioning error of the airborne system. H2 hypothesis refers to all other cases than H0 and H1. The present invention mainly considers fault conditions associated with the ranging source: signal distortion, low signal power, code-carrier separation, super acceleration, and unduly large ephemeris error.

Evaluation of GBAS Integrity Performance Under H0 Hypothesis

Figure 3:
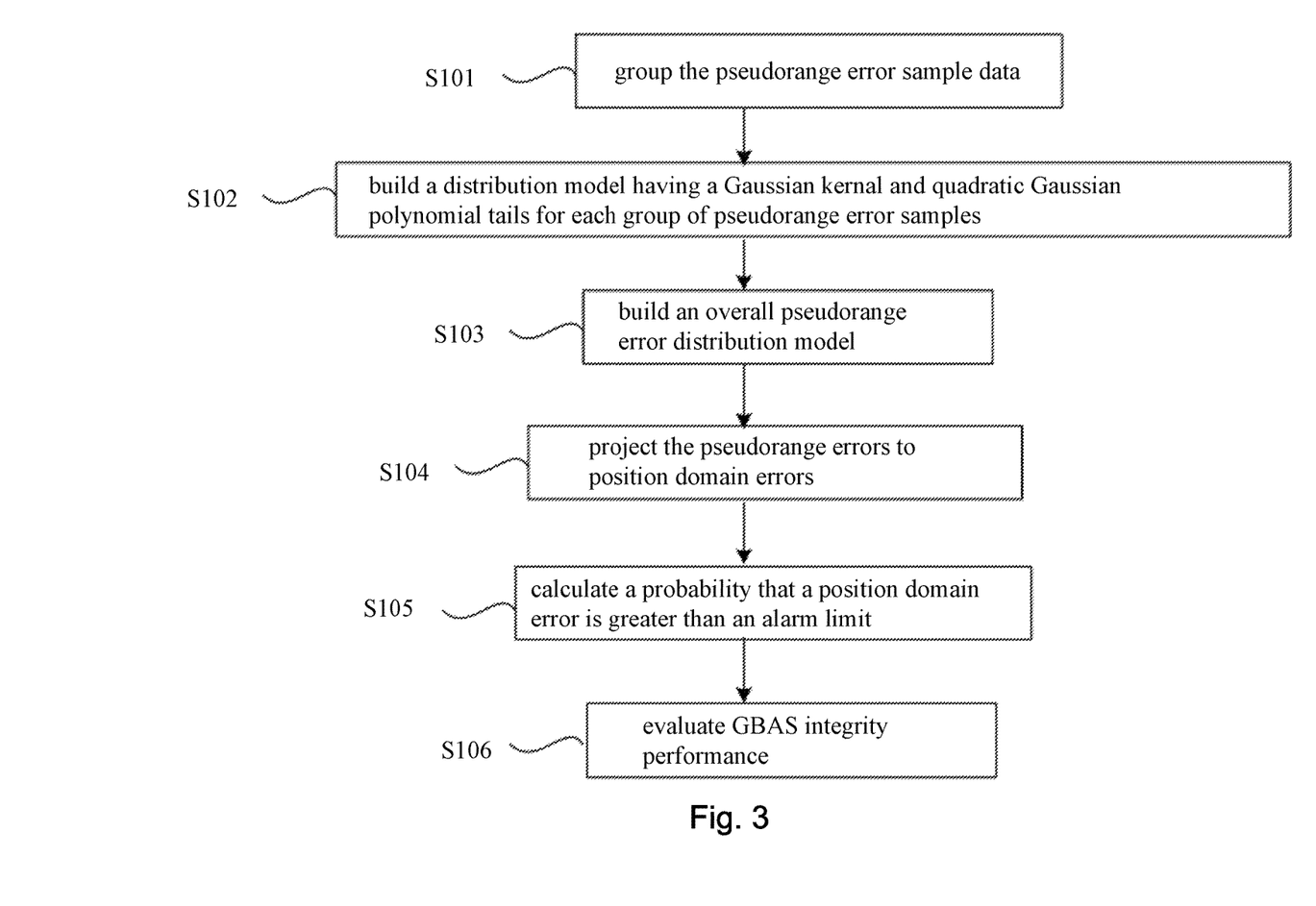
FIG. 3 is a flowchart of evaluation of GBAS integrity performance under H0 hypothesis according to an embodiment of the present invention.

FIG. 3 is a flowchart of evaluation of GBAS integrity performance under H0 hypothesis according to an embodiment of the present invention. The GBAS integrity performance is evaluated by using acquired pseudorange error sample data, including the following method steps:

Step S101, group the pseudorange error sample data.

Since the acquired pseudorange error sample data is limited, the samples have strong correlation and the integrity risk is a small probability event, and it is difficult to calculate the integrity risk probability value from the statistical point of view. Therefore, in the present invention, sampling is performed at equal time intervals, the samples are divided into several groups, error distribution models are established in the pseudorange domain, and then the error distribution models of the groups are mixed to obtain an error distribution model mixing a Gaussian kernel and a quadratic Gaussian polynomial tail. Finally, according to a projection relationship between the pseudorange domain and the position domain, a probability that a domain error is greater than an alarm limit is derived.

According to an embodiment of the present invention, it is assumed that there are m visible satellites acquiring data from a airborne terminal at time intervals of 1 s. The grouping of the acquired pseudorange error sample data includes the following method steps:

acquiring $N_k$ (k=1, 2, . . . m) pseudorange error samples corresponding to each satellite, dividing the pseudorange error samples according to a time interval $\tau$ into $$\frac{N_k}{\tau}$$

groups $$\{T_1, T_2, \ldots, T_i, \ldots, T_{\frac{N_k}{\tau}}\},$$

and then reassembling an ith sample in each group into $t_i$, where there are a total of $\tau$ groups of samples $\{t_1, t_2, \ldots, t_i, \ldots, t_\tau\}$, and m is the quantity of visible satellites.

Step S102, build a distribution model having a Gaussian kernel and quadratic Gaussian polynomial tails for each group of pseudorange error samples.

The building a distribution model having a Gaussian kernel and quadratic Gaussian polynomial tails for each group of pseudorange error samples includes:

calculating a standard deviation $\sigma_i$ of each group of error samples, and fitting an error distribution kernel by using a Gaussian distribution having a mean $\mu_i$ of 0 and a standard deviation of $\sigma_i$, wherein a probability density distribution function is:

$$f_{h,i}(x) = \frac{1}{\sqrt{2\pi}\,\sigma_i} e^{-\frac{x^2}{2\sigma_i^2}}, |x| < E_f,$$

wherein $E_f$ is a kernel-tail demarcation point, and i=1, . . . , $\tau$;

modeling an error distribution tail by using a quadratic polynomial of a Gaussian kernel distribution, wherein a probability density function is:

$$f_{w,i}(x) = af_{h,i}^2(x) + bf_{h,i}(x) = \frac{a}{2\pi\sigma_i^2} e^{-\frac{x^2}{\sigma_i^2}} + \frac{b}{\sqrt{2\pi}\,\sigma_i} e^{-\frac{x^2}{2\sigma_i^2}}, |x| > E_f,$$

wherein a and b are respectively a quadratic coefficient and a primary coefficient, and satisfy a+b=1 and $$0 < a < -\frac{1}{2}.$$

When the kernel-tail demarcation point $E_f$ is given, values of the unknown parameters a and b are estimated in accordance with the principle of least sum of squared deviations and the above two constraints a+b=1 and $$0 < a < -\frac{1}{2}.$$

Specifically, values of unknown parameters, a quadratic coefficient a and a primary coefficient b, are estimated in accordance with the principle of least sum of squared deviations by using the following method:

$$\begin{cases} Q_i(E_f) = \min\left(\sum_{j=1}^{n_f} (f_{w,i}(x_j) - p_j)^2\right) = \min\left(\sum_{j=1}^{n_f} (af_{h,i}^2(x_j) + bf_{h,i}(x_j) - p_j)^2\right) \\ a + b = 1 \\ 0 < a < -\frac{1}{2} \end{cases},$$

wherein $Q_i(E_f)$ is the smallest sum of squared deviations of the ith group when $E_f$ is given, $p_j$ is a sample frequency corresponding to an observation error $x_j$, and $n_f$ is the tail sample size of the ith group of error samples.

When $E_f$ is given, a least sum of squared deviations $Q_i(E_f)$ of the ith group is calculated, a minimum $\min(Q_i(E_f))$ of the least sum of squared deviations is used to determine the kernel-tail demarcation point $E_f$, and a distribution model corresponding to the minimum of the least sum of squared deviations is used as a pseudorange error distribution tail model.

Therefore, the error sample distribution satisfies:

$$f_i(x) = \begin{cases} \alpha f_{h,i}(x), |x| < E_f \\ \alpha f_{w,i}(x), |x| > E_f \end{cases},$$

wherein $$\alpha = \left\{ \int_{x=-\infty}^{-E_f} f_{w,i}(x)dx + \int_{x=-E_f}^{E_f} f_{h,i}(x)dx + \int_{x=E_f}^{\infty} f_{w,i}(x)dx \right\}^{-1}.$$

α is a scale factor and satisfies:

Step S103, calculate a weighted sum of the distribution model of each group of pseudorange errors, to obtain an overall pseudorange error distribution model.

Because the sample size of each group is too small, to ensure that the established error distribution model is closer to the real error distribution, all the samples are marged, and all the pseudorange error distribution models are subjected to weighted summation to obtain an overall pseudorange error distribution model.

Because neighboring sample groups have similar information amounts, error distribution models established by using neighboring sample groups are similar. To describe the contribution of each error distribution model to the overall error distribution model, a weighting factor is defined for each error distribution model. All the error distribution models are divided into four groups, the weight of the first error distribution model in each group being $$q_1 = \frac{1}{4} * \frac{1}{2},$$

that is, ⅛.

According to the degree of similarity between information amounts, weights are sequentially assigned to the other error distribution models in each group:

$$\{q_2, q_3, \ldots, q_n\} = \left\{ \frac{\beta}{n-1}, \frac{2\beta}{n-1}, \ldots, \beta \right\},$$

wherein n is the number of error distribution models in each group, and β satisfies $$\sum_{i=1}^{n-1} \frac{i\beta}{n-1} = \frac{1}{8},$$

Therefore, corresponding to the kth visible satellite, the overall error distribution model is:

$$f_k(x) = \sum_{i=1}^{n} \sum_{j=0}^{3} q_i f_{i+jn}(x)$$

wherein k=1, . . . , m.

Step S104, project the pseudorange errors to position domain errors.

A pseudorange $r_k$ (k=1, . . . , m) between the ith satellite and the receiver is: $r_k = d_k + ct_r + x_k$, wherein $d_k$ is the real distance between the kth satellite and the receiver, $t_r$ is a receiver clock error, c is the speed of light, $x_k$ is the pseudorange error.

The pseudorange errors are projected to position domain errors, then:

*Y=AX*, wherein $Y = (\Delta x, \Delta y, \Delta z, ct_r)^T$, $\Delta x$, $\Delta y$, $\Delta z$ are positioning errors of x, y, z directions.

$X = (x_1, \ldots, x_m)^T$ represents pseudorange error vectors corresponding to the m satellites.

$A = (H^T W^{-1} H)^{-1} H^T W^{-1}$, H is an m×4 coefficient matrix, and W is an m×m pseudorange error covariance matrix.

Therefore, the position domain error may be expressed as a function of the pseudorange error $X = (x_1, \ldots, x_m)^T$:

horizontal positioning error $y_H = \sqrt{X^T \tilde{A} X}$, wherein $\tilde{A} = a_x^T a_x + a_y^T a_y$, and $a_x$, $a_y$ are respectively first and second row vectors of the matrix A.

vertical positioning error $y_L = a_z X$, wherein $a_z$ is a third row vector of the matrix A.

Step S105, calculate a probability that a position domain error is greater than an alarm limit, to obtain an integrity risk probability value.

A probability that the horizontal positioning error is greater than the alarm limit is:

$$P(|y_H| > HAL) = \int_{X^T \tilde{A} X > HAL^2} \cdots \int \prod_{i=1}^{m} f_k(x_k) dx_1 \ldots dx_m,$$

wherein $y_H = \sqrt{(\Delta x)^2 + (\Delta y)^2}$ is the horizontal positioning error.

A probability that the vertical error is greater than the alarm limit is:

$$P(|y_L| > LAL) = \int_{|a_2 X| > LAL} \cdots \int \prod_{i=1}^{m} f_k(x_k) dx_1 \cdots dx_m,$$

wherein $y_L = \Delta z$ is a vertical error.

A probability that the positioning error is greater than the alarm limit is a sum of the probability that the horizontal positioning error is greater than the alarm limit and the probability that the vertical positioning error is greater than the alarm limit:

$$P(|y|>AL)=P(|y_H|>HAL)+P(|y_L|>LAL).$$

Step S106, evaluate GBAS integrity performance.

According to the present invention, in this embodiment, under H0 hypothesis, the reference receiver and the ranging source are both fault-free. The GBAS integrity performance is evaluated by using $P_{risk}=P(|y|>AL)P_{free-fault}$, wherein y is a position domain error, AL is an alarm limit, $P_{free-fault}$ is a probability that both a reference receiver and a ranging source are fault-free and has a value of 1, and $P_{risk}$ is the integrity risk probability value.

Evaluation of GBAS Integrity Performance Under H1 Hypothesis

Figure 4:
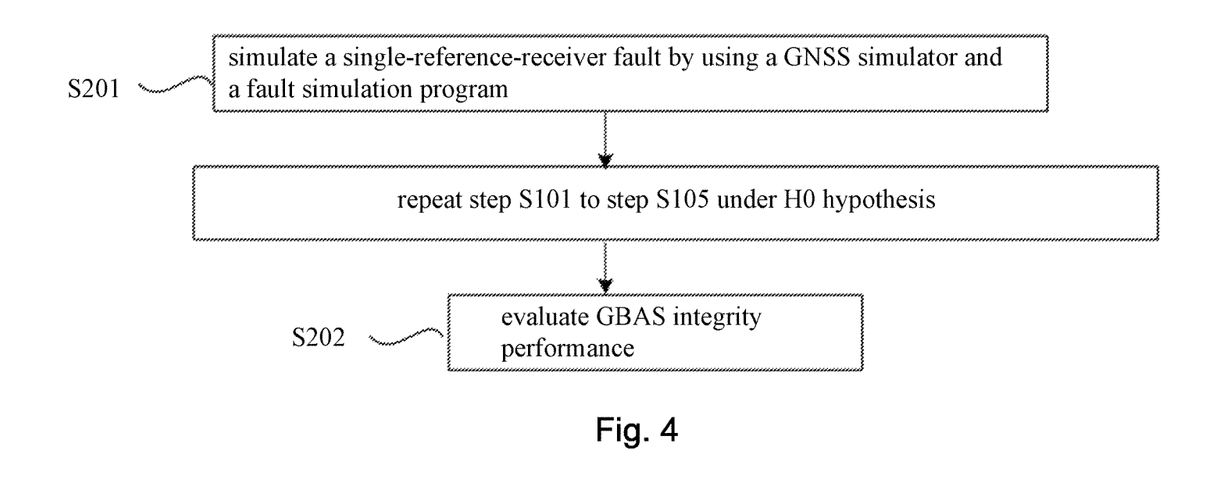
FIG. 4 is a flowchart of evaluation of GBAS integrity performance under H1 hypothesis according to another embodiment of the present invention.

FIG. 4 is a flowchart of evaluation of GBAS integrity performance under H1 hypothesis according to another embodiment of the present invention. The GBAS integrity performance is evaluated by using acquired pseudorange error sample data, including the following method steps:

Step S201, simulate a single-reference-receiver fault by using a GNSS simulator and a fault simulation program, wherein the GNSS simulator generates a satellite signal is radio frequency connected to the reference receiver, and the fault simulation program receives ranging information from the reference receiver, and adds a slope error to the ranging information from the reference receiver according to a fault parameter configuration, to simulate the single-reference-receiver fault.

The slope error model is described as:

$$\rho(t)=k(t-t_0)U(t-t_0),$$

where $\rho(t)$ is an error caused by the single-reference-receiver fault, k is the slope of the slope error, $t_0$ is a fault introducing time, and $U(t-t_0)$ is a step function.

The process of step S101 to step S105 for the evaluation of GBAS integrity performance under H0 hypothesis in the above embodiment is repeated by using the pseudorange error sample data that is caused by the single-reference-receiver fault and obtained by using the above method.

Step S202, evaluate GBAS integrity performance.

According to the present invention, in this embodiment, under H1 hypothesis, there is only one faulty reference receiver. The GBAS integrity performance is evaluated by using $P_{risk}=P(|y|>AL)P_{receiver-fault}$, wherein y is a position domain error, AL is an alarm limit, $P_{receiver-fault}$ is a probability that only one reference receiver is faulty and has a value of $10^{-5}$, and $P_{risk}$ is the integrity risk probability value.

Evaluation of GBAS Integrity Performance Under H2 Hypothesis

Figure 5:
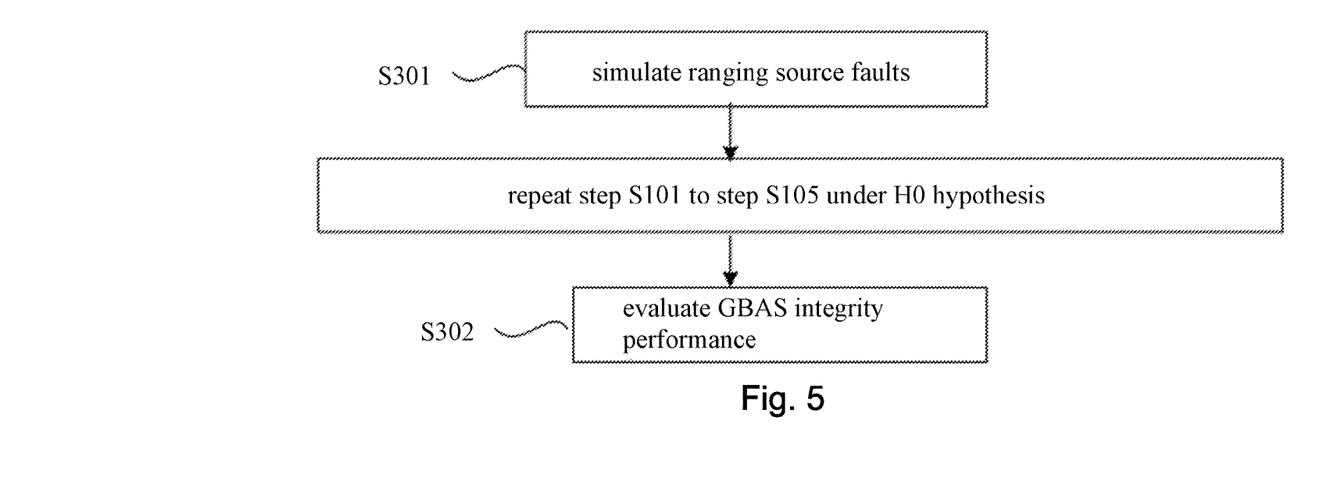
FIG. 5 is a flowchart of evaluation of GBAS integrity performance under H2 hypothesis according to still another embodiment of the present invention.

FIG. 5 is a flowchart of evaluation of GBAS integrity performance under H2 hypothesis according to still another embodiment of the present invention. The GBAS integrity performance is evaluated by using acquired pseudorange error sample data, including the following method steps:

Step S301, simulate ranging source faults.

simulating fives ranging source faults including signal distortion, low signal power, code-carrier separation, unduly large ephemeris error, and super acceleration by using a GNSS simulator and a fault simulation program, wherein the GNSS simulator generates a satellite signal is radio frequency connected to a reference receiver, and the fault simulation program receives ranging information from the reference receiver, sets fault parameters, adds a slope error model to simulate four ranging source faults including signal distortion, low signal power, code-carrier separation, and unduly large ephemeris error, and adds a squared error model to simulate the super acceleration fault. The process of adding the slope error model to simulate four ranging source faults including signal distortion, low signal power, code-carrier separation, and unduly large ephemeris error is the same as that of adding the slope error model under H1 hypothesis, and will not be described herein again.

The squared error model is described as:

$$\rho(t)=A(t-t_0)^2 U(t-t_0)$$

wherein $\rho(t)$ is an error caused by super acceleration, A is a quadratic coefficient, $t_0$ is a fault introducing time, and $U(t-t_0)$ is a step function.

The process of step S101 to step S105 for the evaluation of GBAS integrity performance under H0 hypothesis in the above embodiment is repeated by using the pseudorange error sample data obtained by using the above method under the fives ranging source faults including signal distortion, low signal power, code-carrier separation, unduly large ephemeris error, and super acceleration.

Step S302, evaluate GBAS integrity performance.

According to an embodiment of the present invention, under H2 hypothesis, faults including signal distortion, low signal power, code-carrier separation, unduly large ephemeris error, and super acceleration are considered. The GBAS integrity performance is evaluated by using $P_{risk}=P(|y|>AL)P_{fault}$, wherein y is a position domain error, AL is an alarm limit, $P_{fault}$ is a probability of occurrence of fives ranging source faults including signal distortion, low signal power, code-carrier separation, unduly large ephemeris error, and super acceleration, and $P_{risk}$ is the integrity risk probability value.

The measured integrity risk probability values under H0, H1, and H2 hypotheses are respectively compared with the required integrity risk probability values to evaluate whether integrity performance of the installed GBAS reaches a standard. If the measured integrity risk probability value is less than the required risk value, it indicates that the system integrity performance is good. If the measured integrity risk is greater than the required risk value, it indicates that the system integrity performance does not reach the standard.

In the GBAS integrity performance evaluation method based on a pseudorange error distribution model according to the present invention, under H0 hypothesis, measured data is acquired and grouped, and a error distribution model with a Gaussian kernel and a quadratic Gaussian polynomial tail is established for each group. The error distribution models of the groups of samples is subjected to weighted summation to obtain a mixed error distribution model. According to the projection relationship between position domain errors and pseudorange errors, an integrity risk probability value under H0 is obtained. The obtained integrity risk probability value is compared with an integrity risk probability value assigned for the H0 situation, to evaluate the GBAS integrity performance under H0 hypothesis.

Under H1 hypothesis, a GNSS signal simulator is used in combination with a fault simulation program to add a slope fault model to simulate a single-reference-receiver fault, data is acquired from a user terminal and grouped, and a error distribution model with a Gaussian kernel and a quadratic Gaussian polynomial tail is established for each group. The error distribution models of the groups of samples is subjected to weighted summation to obtain a mixed error distribution model. According to the projection relationship between position domain errors and pseudorange errors, an integrity risk probability value under H1 is obtained. The obtained integrity risk probability value is compared with an integrity risk probability value assigned for the H1 situation, to evaluate the GBAS integrity performance under H1 hypothesis.

Under H2 hypothesis, a GNSS signal simulator is used in combination with a fault simulation program to add a slope fault model to simulate signal distortion, low signal power, code-carrier separation, and unduly large ephemeris error fault, and add a squared error fault model to simulate the super acceleration fault data is acquired from a user terminal and grouped, and a error distribution model with a Gaussian kernel and a quadratic Gaussian polynomial tail is established for each group. The error distribution models of the groups of samples is subjected to weighted summation to obtain a mixed error distribution model. According to the projection relationship between position domain errors and pseudorange errors, an integrity risk probability value corresponding to each fault under H2 is obtained. The obtained integrity risk probability values are respectively compared with integrity risk probability values assigned for the faults, to evaluate the GBAS integrity performance under H2 hypothesis.

In the GBAS integrity performance evaluation method based on a pseudorange error distribution model according to the present invention, the error samples are first grouped according to a certain time interval, and then the error samples with the same time serial number in each group are recombined to form a new error sample group, and an error distribution model is established for each new error sample group. A weight is assigned to each error distribution model according to the contribution of each error distribution model to the overall error model and the relationship between information amounts of the distribution models.

In the GBAS integrity performance evaluation method based on a pseudorange error distribution model according to the present invention, to improve the accuracy of the pseudorange error distribution model and the effectiveness of evaluation of the GBAS integrity performance, the concept of quadratic Gaussian polynomial distribution is proposed. To improve the calculation precision of the integrity risk probability value, the proposed quadratic Gaussian polynomial distribution is used to approximate the real distribution tail of pseudorange errors. The distribution with the Gaussian kernel and the quadratic Gaussian polynomial tail is used to approximate an overall pseudorange error distribution, and according to the projection relationship between position domain errors and pseudorange errors, the integrity risk probability value is calculated.

The GBAS integrity performance evaluation method based on a pseudorange error distribution model according to the present invention, Provided that the kernel-tail demarcation point of the error distribution is given, unknown parameters of the pseudorange error distribution tail are estimated in accordance with the principle of least sum of squared deviations and constraints of unknown parameters, and the value of the smallest sum of squared deviations is calculated. The smallest sum of squared deviations is expressed as a function of the kernel-tail demarcation point of the pseudorange error distribution model. The smallest value of the function is calculated to determine the kernel-tail demarcation point, and distribution model parameters corresponding to the minimum of the smallest sum of squared deviations are used as parameter values of the pseudorange error distribution tail.

Based on the description and practice of the present invention as disclosed herein, other embodiments of the present invention can be readily figured out and understood by those skilled in the art. The descriptions and embodiments should be considered as examples only, and the true scope and concept of the present invention are subject to claims.

What is claimed is:

1. A ground-based augmentation system (GBAS) integrity performance evaluation method based on a pseudorange error distribution model, wherein a data processor performs GBAS integrity performance evaluation by acquiring pseudorange error sample data, including the following method steps:
   a) grouping the pseudorange error sample data;
   b) building a distribution model having a Gaussian kernel and quadratic Gaussian polynomial tails for each group of pseudorange error samples, including:
   calculating a standard deviation $\sigma_i$ of each group of error samples, and fitting an error distribution kernel by using a Gaussian distribution having a mean $\mu_i$ of 0 and a standard deviation of $\sigma_i$, wherein a probability density distribution function is:

$$f_{h,i}(x) = \frac{1}{\sqrt{2\pi}\,\sigma_i} e^{-\frac{x^2}{2\sigma_i^2}}, \ |x| < E_f,$$

wherein $E_f$ is a kernel-tail demarcation point, and $i=1, \ldots, \tau$;

modeling an error distribution tail by using a quadratic polynomial of a Gaussian kernel distribution, wherein a probability density function is:

$$f_{w,i}(x) = a f_{h,i}^2(x) + b f_{h,i}(x) = \frac{a}{2\pi\sigma_i^2} e^{-\frac{x^2}{\sigma_i^2}} + \frac{b}{\sqrt{2\pi}\,\sigma_i} e^{-\frac{x^2}{2\sigma_i^2}}, \ |x| > E_f,$$

wherein a and b are respectively a quadratic coefficient and a primary coefficient, and satisfy $a+b=1$ and $$0 < a < -\frac{1}{2};$$

and
the error sample distribution satisfies:

$$f_i(x) = \begin{cases} \alpha f_{h,i}(x), & |x| < E_f \\ \alpha f_{w,i}(x), & |x| > E_f \end{cases},$$

wherein

α is a scale factor and satisfies:

$$\alpha = \left\{ \int_{x=-\infty}^{-E_f} f_{w,i}(x)dx + \int_{x=-E_f}^{E_f} f_{h,i}(x)dx + \int_{x=E_f}^{\infty} f_{w,i}(x)dx \right\}^{-1};$$

c) calculating a weighted sum of the distribution model of each group of pseudorange errors, to obtain an overall pseudorange error distribution model;

d) projecting the pseudorange errors to position domain errors;

e) calculating a probability that a position domain error is greater than an alarm limit, to obtain an integrity risk probability value; and f) evaluating GBAS integrity performance.

2. The method according to claim 1, wherein the grouping the pseudorange error sample data, including the following method steps:

acquiring $N_k$ (k=1, 2, . . . , m) pseudorange error samples corresponding to each satellite, dividing the pseudorange error samples according to a time interval τ into $$\frac{N_k}{\tau}$$

groups $$\left\{ T_1, T_2, \ldots, T_i, \ldots, T_{\frac{N_k}{\tau}} \right\},$$

and then reassembling an ith sample in each group into $t_i$, where there are a total of τ groups of samples {$t_1$, $t_2$, . . . , $t_i$, . . . , $t\tau$}, and m is the quantity of visible satellites.

3. The method according to claim 1, wherein values of the unknown parameters a and b of the probability density function of the pseudorange error distribution tail are estimated in accordance with the principle of least sum of squared deviations.

4. The method according to claim 1, wherein when $E_f$ is given, a least sum of squared deviations $Q_i(E_f)$ of the ith group is calculated, and a minimum min($Q_i(E_f)$) of the least sum of squared deviations is used to determine the kernel-tail demarcation point $E_f$.

5. The method according to claim 1, wherein the GBAS integrity performance under H0 hypothesis is evaluated by using $P_{risk}=P(|y|>AL)P_{free-fault}$, wherein y is a position domain error, AL is an alarm limit, $P_{free-fault}$ is a probability that both a reference receiver and a ranging source are fault-free and has a value of 1, and $P_{risk}$ is the integrity risk probability value.

6. The method according to claim 1, wherein when the GBAS integrity performance under H1 hypothesis is evaluated, the method further includes, before the step a), simulating a single-reference-receiver fault by using a GNSS simulator and a fault simulation program, wherein the GNSS simulator generates a satellite signal is radio frequency connected to the reference receiver, and the fault simulation program receives ranging information from the reference receiver, and adds a slope error to the ranging information from the reference receiver according to a fault parameter configuration, to simulate the single-reference-receiver fault.

7. The method according to claim 6, wherein the GBAS integrity performance under H1 hypothesis is evaluated by using $P_{risk}=P(|y|>AL)P_{receiver-fault}$, wherein y is a position domain error, AL is an alarm limit, $P_{receiver-fault}$ is a probability that only one reference receiver is faulty and has a value of $10^{-5}$, and $P_{risk}$ is the integrity risk probability value.

8. The method according to claim 1, wherein when the GBAS integrity performance is evaluated under H2 hypothesis, the method further includes, before the step a), simulating fives ranging source faults including signal distortion, low signal power, code-carrier separation, unduly large ephemeris error, and super acceleration by using a GNSS simulator and a fault simulation program, wherein the GNSS simulator generates a satellite signal is radio frequency connected to a reference receiver, and the fault simulation program receives ranging information from the reference receiver, sets fault parameters, adds a slope error model to simulate four ranging source faults including signal distortion, low signal power, code-carrier separation, and unduly large ephemeris error, and adds a squared error model to simulate the super acceleration fault.

9. The method according to claim 8, wherein the GBAS integrity performance under H2 hypothesis is evaluated by using $P_{risk}=P(|y|>AL)P_{fault}$, wherein y is a position domain error, AL is an alarm limit, $P_{fault}$ is a probability of occurrence of fives ranging source faults including signal distortion, low signal power, code-carrier separation, unduly large ephemeris error, and super acceleration, and $P_{risk}$ is the integrity risk probability value.

* * * * *